J. Allender,
Wringer.
No. 1,934. Reissued Apr. 18, 1865.
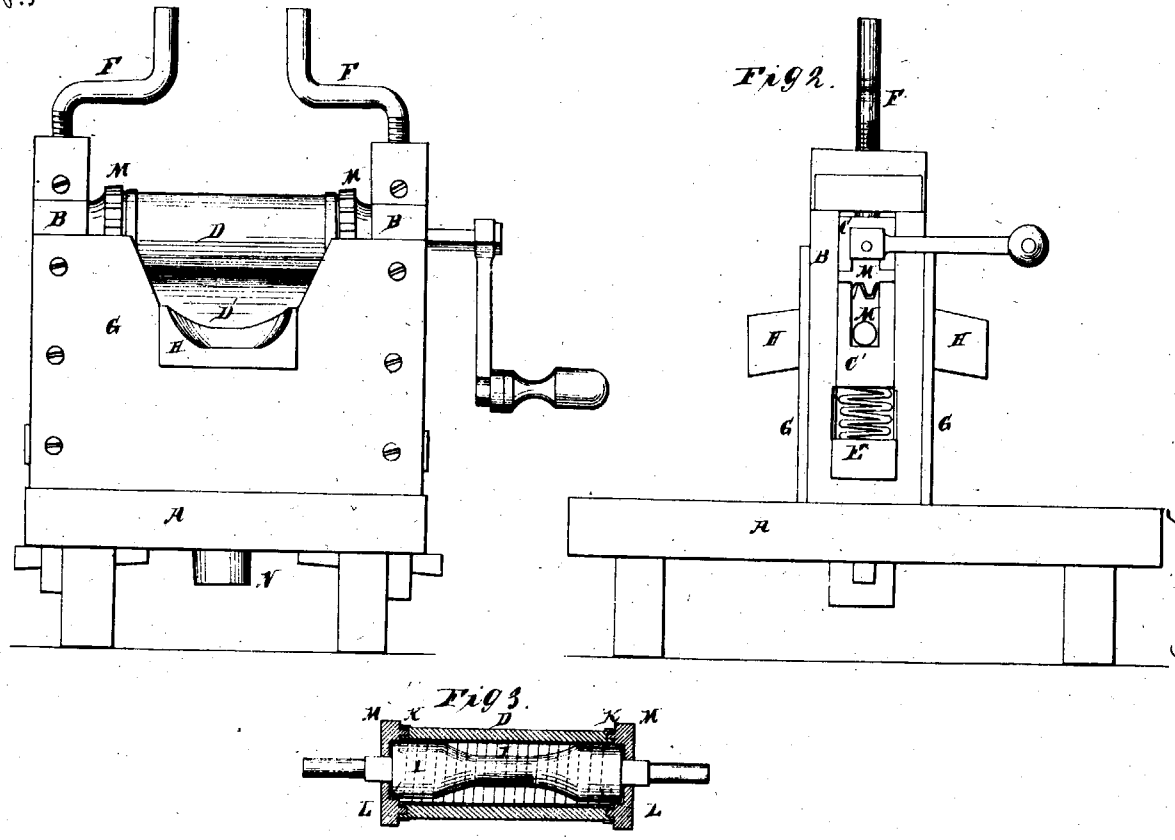
Witnesses:
John Grace
John R. Rockstroh
Inventor
John Allender

UNITED STATES PATENT OFFICE.

S. A. BAILEY, S. S. COOK, AND B. M. COOK, OF WOONSOCKET, RHODE ISLAND, ASSIGNEES, BY MESNE ASSIGNMENTS, OF JOHN ALLENDER, OF NEW LONDON, CONNECTICUT.

IMPROVED WRINGING-MACHINE.

Specification forming part of Letters Patent No. 22,539, dated January 11, 1859; reissue No. 1,709, dated June 28, 1864; reissue No. 1,807, dated November 8, 1864; reissue No. 1,934, dated April 18, 1865.

*To whom it may concern:*

Be it known that JOHN ALLENDER, of New London, and county of New London and State of Connecticut, did invent a new and useful Roller for Squeezing the Water, Dyeing-Liquor, &c., from Cloth, Clothes, &c.; and we do hereby declare that the same is described and represented in the following specification and drawing.

To enable others skilled in the art to make and use said invention, we will proceed to describe its construction and use, referring to the drawing, in which the same letters indicate like parts in each of the figures.

Figure 1 is a front elevation of a pair of squeezers with said new rollers. Fig. 2 is a side elevation of the same. Fig. 3 is a section of said rollers.

The nature of said invention consists in a roller made of a spirally-coiled spring, arranged on a shaft or roller, made smallest in the middle to allow the spring to yield, which spring is covered with India rubber or some flexible material that will yield or bend readily to the cloth, clothes, or other articles being squeezed by the rollers.

In the accompanying drawing, A is the base of the frame of the squeezing-rollers, to which the standards B B are fastened. In each of these standards there is a long slot, in which the boxes C of the top roller D and the boxes C of the bottom roller D are fitted to traverse, the boxes C being pressed upward by the spiral spring E placed between the bottom of the slot and the box, as shown in Fig. 2. The screws F F act against the top boxes C to press the rollers together, and press them down, and press the boxes C against the spring E to produce the required pressure between the rollers for the cloth or clothes to be squeezed. The standards B B are boarded upon each side of the rollers, as shown in Fig. 1 at G, and a guide, H, is fastened to the boarding G, to guide the cloth or clothes between the rollers. The rollers D D consist of a shaft or central roller, I, made smaller in the middle, as shown in Fig. 3. This shaft is surrounded by a flat metal spring, coiled spirally so as to form a cylinder, J, of a uniform diameter from end to end, as shown in Fig. 3. Around this spring-cylinder J there is a cylindrical covering, D, made of India rubber or some flexible material that will yield or bend readily as the spring-cylinder inside of it yields to the pressure of the cloth or clothes passing between the rollers. This India-rubber covering is surrounded with a thin hoop, K, at each end, and is pierced by several spurs L L on the gears M M, which are firmly fastened to the shaft I to make both the rollers turn together as the cloth or clothes being squeezed pass between them; and the water squeezed from the cloth runs from the under roller between the boards G G onto the base A, and through the spout N away from the machine.

The central roller I, being made smaller in the middle, allows the coiled-spring cylinder to yield to the varying thickness of the cloth or clothes passing between the rollers.

We believe that we have described and represented the yielding roller which said ALLENDER invented so as to enable any person skilled in the art to make and use it.

What we claim as new in said invention, and desire to secure by Letters Patent, is—

1. A roller made of a spirally-coiled spring, arranged on a shaft or roller made smaller at the center than at the ends, as and for the purposes specified.

2. A roller so constructed as to yield more at its center than at or near its ends, covered with vulcanized rubber or any other elastic compound impervious to water, substantially as and for the purpose set forth.

3. Cog-wheels, in combination with rollers of vulcanized rubber or any other elastic substance or compound impervious to water, for the purpose set forth.

4. Rollers made of or covered with vulcanized rubber or any other elastic substance or compound impervious to water, when used in combination with cog-wheels and a spring or springs around the shaft of the roller, for the purpose set forth.

5. Rollers for washing or wringing machines, made of or covered with vulcanized rubber or any other elastic substance or compound impervious to water, when used in combination with adjusting spring or springs.

6. Rollers for washing or wringing machines, made of or covered with vulcanized rubber or any other elastic substance or compound impervious to water, when used in combination with adjusting spring or springs and screw or screws to adjust the pressure to the spring S and rollers.

SELDEN A. BAILEY. [L. S.]
SIMEON S. COOK. [L. S.]
BENEDICT M. COOK. [L. S.]

Witnesses:
WM. L. CHASE,
D. F. WILLIAMS.